July 29, 1958 F. W. GUIBERT 2,845,031
GEAR TOOTH CONSTRUCTION FOR ROTARY FLUID METERS
Filed Jan. 13, 1953
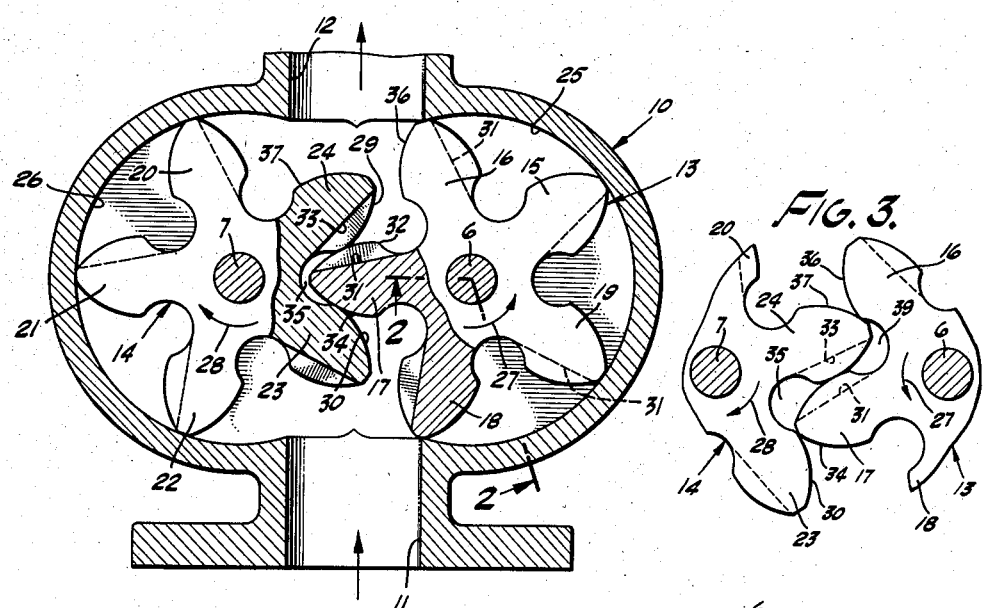
FIG. 1.
FIG. 3.
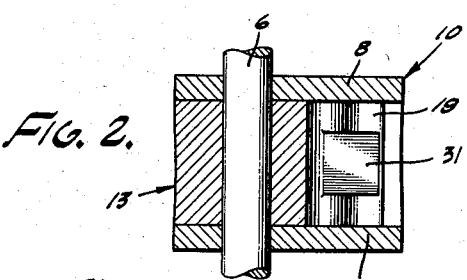
FIG. 2.
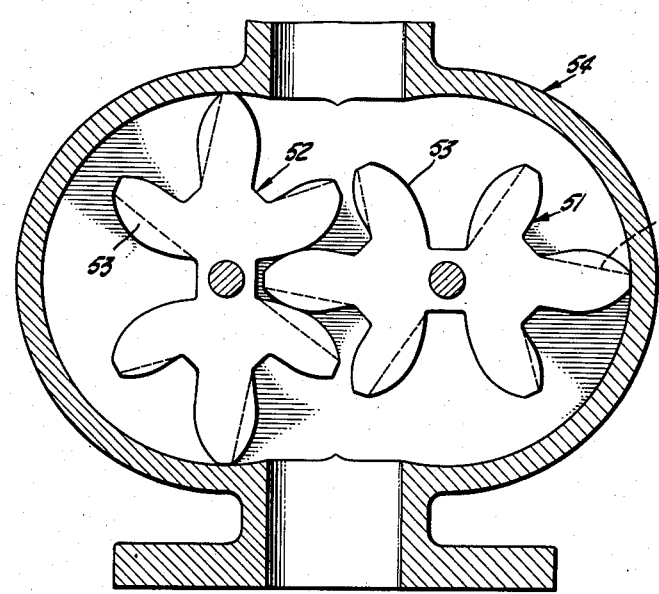
FIG. 4.
FIG. 5.
FRANCIS W. GUIBERT
INVENTOR.
BY *John Flam*
ATTORNEY

2,845,031

GEAR TOOTH CONSTRUCTION FOR ROTARY FLUID METERS

Francis W. Guibert, Los Angeles, Calif.

Application January 13, 1953, Serial No. 331,023

1 Claim. (Cl. 103—126)

This invention relates to a gear tooth construction for rotary fluid meters, gear pumps, and the like.

In order to ensure smooth operation of gear pumps and the like, cyclic variations in load, caused by the building up of pressure between the confines of the interengaging gear structures, are prevented by the provision of pressure relieving recesses. Such recesses ensure uniform pressure characteristics, and guard against excessive wear that otherwise would result upon release of the confined liquid at high velocities past the gear tooth surfaces.

Gear tooth structures for these purposes have been employed; but such structures are unconcerned with the important problem of preserving accuracy, such as in a meter. Particularly, such systems admit of an indeterminate amount of leakage or slippage past the gear surfaces. It is, accordingly, an object of the present invention to provide a gear tooth construction incorporating improved pressure relieving recesses, that not only ensures uniform load and mitigates against excessive wear, but that also aids in preventing slippage or leakage past the interengaging gear structures, thereby achieving better accuracy for the meter and smoother operation of the gear operated mechanism.

To accomplish this result, there is provided a particular orientation of the recesses in the teeth of the interengaging structures, so that one surface of the gear teeth maintains proper contact to prevent leakage, while the other surface provides appropriate pressure relief. Accordingly, a closed space or trap is never formed, and accuracy is maintained, in addition to improving the speed and load characteristics of the meter or pump.

It is another object of this invention to provide an improved form of rotor tooth structure for achieving smooth running characteristics. For this purpose, grooves or slots on one side of the teeth, and extending from the recess between adjacent teeth substantially to the crown thereof, are provided.

It is another object of this invention to provide a device of this character that is simple in construction.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claim.

Referring to the drawings:

Figure 1 is a fragmentary sectional view of a meter incorporating the present invention;

Fig. 2 is a sectional view, taken along the plane corresponding to line 2—2 of Fig. 1;

Fig. 3 is a view showing the structure of Fig. 1 in a slightly different position;

Fig. 4 is a sectional view similar to Fig. 1, but illustrating the invention incorporated in a meter of a different construction than that illustrated in Fig. 1; and Fig. 5 is a view similar to Fig. 2, but illustrating a modified form of the present invention.

In the Form illustrated in Fig. 1, a fluid meter or pump permits passage of a liquid medium, such as water. A casing 10 has aligned inlet and outlet pasages 11 and 12 at opposite ends that appropriately connect with a fluid conduit.

Rotors 13 and 14 are supported on spaced parallel axes by the aid of shafts 6 and 7 which are, in turn, appropriately mounted in the side walls 8 and 9 of the casing 10. The rotors 13 and 14 are generally in the form of gear structures. The rotor 13 in this instance has five teeth 15, 16, 17, 18 and 19 equiangularly and uniformly distributed about the axis of the rotor 13. Teeth 20, 21, 22, 23 and 24 are similarly provided on the other rotor 14.

The casing 10 has symmetrically arranged cylindrical surfaces 25 and 26 corresponding to, and accommodating with minimum clearance, the outer portions of the rotors 13, 14. Accordingly, the teeth 20, 21 and 22 of the rotor 14, and teeth 16, 18, 19 and 15 of the rotor 13 cooperate with the casing 10 to define distinct and isolated spaces, preventing indiscriminate flow of fluid around the outside of the rotors. The interengagement of the teeth 23 and 24 of the rotor 14 with the tooth 17 of the rotor 13 ensures against slippage or unmetered flow of fluid between the rotors. The inlet and outlet passages 11 and 12, for any given position of the rotors, are thus effectively isolated.

When the device operates as a meter, the preponderance of fluid pressure at the inlet 11 causes the rotors 13 and 14 to rotate in the directions of the arrows 27 and 28. When the device operates as a pump, the power is provided to the rotors by outside means. Successive discrete volumes of fluid are carried in the separate pockets formed by the teeth and the cylindrical surfaces 25 and 26 from the inlet 11 to the outlet 12. The isolated relationship between the inlet and outlet passages 11 and 12 is, nevertheless, always maintained, in that distinct segments of fluid are continuously and in sequence discharged.

For operation as a meter, the rotary motion of the rotors, or either of them, operates appropriately calibrated indicators (not shown) for showing rate of flow or the integrated flow through the device.

In the course of rotation, a space, such as that designated by the reference character 35, is formed between the shallow or crotch of adjacent teeth 23 and 24 of one rotor 14 through engagement of the opposed sides 29 and 30 of these respective teeth with opposite sides respectively of the interengaging tooth 17 of the other rotor 13. As rotation progresses, the effective volume of this space 35 is subject both to increase and decrease. Were this space or pocket 35 permitted to be closed, it is apparent that a hydraulic load would be imposed upon the structure such as to slow down the speed of the rotors. Since there are five recesses between the teeth of each rotor, and a space such as 35 is found for each such recess, compaction would occur intermittently, and ten times for each cycle of operation of this particular device. Vibration, chatter and inefficiency can be avoided by ensuring that ample clearance is provided to permit unrestricted passage of fluid, preventing the pockets from becoming closed. Furthermore, by preventing such sealing relationship, wear can be materially lessened, since excessive turbulence and high velocity of the fluid are obviated.

For this purpose, each tooth of the rotor 13 is provided with a slot or groove 31 on one side surface, the groove 31 extending substantially the entire length of the tooth. Corresponding grooves 33 are provided on the side surfaces of the teeth of the rotor 14. The grooves are so located that, for engaging teeth 17 and 24, for instance, the grooves 31 and 33 of the respective teeth oppose each other on corresponding interengaging side surfaces 32 and 29 of the teeth 17 and 24. Since these grooves in the teeth 17 and 24 similarly extend from the crown of the respective teeth to the shallow between adjacent teeth and to the space 35, ample clearance is provided to permit unrestricted passage of fluid between the space 35 and the outlet 12.

The other side 34 of the tooth 17 is of conventional form, and so also is the side 30 of the tooth 23 which it engages. Accordingly, these surfaces are in contact through the entire period that the teeth 17 and 23 are operative. These surfaces prevent indiscriminate or unmetered flow of fluid from the inlet 11 to the space 35, but the space 35 is nevertheless maintained in unrestricted communication with the outlet 12.

Upon continued rotation of the rotors 13 and 14 in the directions indicated by the arrows 27 and 28, the unslotted surface 36 of the tooth 16 engages the unslotted surface 37 of the tooth 24 to assume the function of isolating the inlet and the outlet 11 and 12. Such position of the rotors 13 and 14 is shown in Fig. 3. The space 39 formed between the teeth 16 and 17 of the rotor 13 by the tooth 24 communicates with the grooves 31 and 33 for passage of liquid therefrom.

Substantially simultaneously with the engagement of the surfaces 36 and 37, the surfaces 30 and 34 of the teeth 17 and 23 separate. Accordingly, both spaces 39 and 35 are then in communication with the inlet, preventing vacuum in either of these spaces.

In Fig. 5, a slightly different tooth construction is illustrated. In the present case, three slots or grooves 40 extend on one side of the tooth and in parallel relationship. Each of the grooves 40, like grooves 31 and 33, extends from the crown of the tooth to the shallow between the teeth. Whatever specific arrangement of grooves is provided, the combined cross-sectional area and shape of the one or more grooves on each tooth surface must be such, as determined by viscosity, pressure, and the like, to facilitate flow to and from the shallow areas between the teeth, sufficient to provide smooth operation.

By providing grooves on each of the teeth of the respective rotors 13 and 14, and only on the clockwisemost side of the teeth, the mode of operation described is continued throughout complete rotations of the rotors 13 and 14.

It will be noted that a slight volume of fluid may be passed back to the inlet 11 through the interengaging teeth, while a substantially greater volume of liquid passes around the teeth to the outlet 12. The liquid pumped back to the inlet serves to compensate in meter operation for slippage or by-passing that may result between the casing 10 and the outer edges of the teeth, as well as between the sides of the rotors and the end plates for the casing.

In the form illustrated in Fig. 4, grooves 50 are illustrated, incorporated in rotor structures 51 and 52 of modified form. These rotor structures 51 and 52 are generally elliptical, constructed in accordance with a patent in the name of Francis W. Guibert and Frederic B. Fuller, No. 2,407,698, issued September 17, 1946, and entitled Fluid Pressure Device. The mode of operation of such elliptical rotor structures is described in detail in said patent.

In the present instance, the grooves 50 are located on the counterclockwisemost surfaces of the teeth 53, and the clockwisemost surfaces thereof operate to isolate the inlet and outlet of the casing 54. As before, the grooves 50 prevent hydraulic compaction, pressure drop, attendant wear, and unsteady inefficient operation, while proper operation of the fluid motor is ensured by the interengagement of the other teeth surfaces.

The inventor claims:

In a rotor structure for hydraulic apparatus: a pair of rotors having interengaging teeth, there being troughs intermediate the teeth of each rotor for accommodating the teeth of the other rotor, the troughs of each rotor clearing the crowns of the teeth of the other rotor; each tooth having opposite operative sides; one side of each tooth of each rotor forming with the correspondingly angularly situated sides of the other teeth of that rotor, a first set of sides; the remaining sides of the teeth of each rotor forming a second set of sides; the sides of the first sets of sides engaging each other in sequence; the sides of the second sets of sides engaging each other in sequence; and slot forming means provided only in the sides of the first set of one of the rotors, and extending throughout the working depth of the sides of the first set; the sides of the second set of the other of the rotors being unslotted; the size of the troughs with respect to the teeth being such that engaging sides of the second sets of sides move out of engagement simultaneously with the movement into engagement of the sides of the second sets next in succession.

References Cited in the file of this patent

UNITED STATES PATENTS

| | | |
|---|---|---|
| 1,633,793 | Porst | June 28, 1927 |
| 1,686,867 | Kuhn | Oct. 9, 1928 |
| 1,728,528 | Butler | Sept. 17, 1929 |
| 1,728,529 | Butler | Sept. 17, 1929 |
| 2,149,326 | Wilkin | Mar. 7, 1939 |
| 2,344,628 | Monahan | Mar. 21, 1944 |
| 2,498,790 | Caughrean | Feb. 28, 1950 |
| 2,601,003 | Pontius | June 17, 1952 |
| 2,601,004 | Cintron | June 17, 1952 |

FOREIGN PATENTS

| | | |
|---|---|---|
| 578,809 | Great Britain | July 12, 1946 |